(12) United States Patent
Hallivuori (10) Patent No.: US 8,724,514 B2
(45) Date of Patent: May 13, 2014

(54) METHOD AND A DEVICE FOR CONTROLLING ADVERTISING OF ROUTING DATA

(75) Inventor: Ville Hallivuori, Espoo (FI)

(73) Assignee: Tellabs Oy, Espoo (FI)

( * ) Notice: Subject to any disclaimer, the term of this patent is extended or adjusted under 35 U.S.C. 154(b) by 477 days.

(21) Appl. No.: 13/195,283

(22) Filed: Aug. 1, 2011

(65) Prior Publication Data

US 2012/0063460 A1 Mar. 15, 2012

(30) Foreign Application Priority Data

Sep. 15, 2010 (FI) .................................... 20105945

(51) Int. Cl.
*H04L 12/28* (2006.01)
(52) U.S. Cl.
USPC ...... 370/255; 370/252; 370/352; 370/395.31; 370/400; 709/242
(58) Field of Classification Search
USPC ................... 370/252, 255, 352, 395.31, 400; 709/242
See application file for complete search history.

(56) References Cited

U.S. PATENT DOCUMENTS

| | | | |
|---|---|---|---|
| 6,968,393 B1 | 11/2005 | Chen et al. | |
| 2008/0107114 A1 | 5/2008 | Liu | |
| 2009/0257439 A1 | 10/2009 | Xu | |
| 2013/0235716 A1* | 9/2013 | Vasseur | 370/221 |

FOREIGN PATENT DOCUMENTS

| | | |
|---|---|---|
| EP | 1909437 | 4/2008 |
| WO | 2007000733 | 1/2007 |

OTHER PUBLICATIONS

Finnish Search Report dated May 17, 2011 in a corresponding Finnish application.
Mattia Rossi, "Implementing path-exploration damping in the Quagga Software Routing Suite Version 0.99.13—patch set version 0.3", CAIA Technical Report 090730A, Jul. 2009, p. 1-11.
H. Berkowitz et al., "Benchmarking Methodology for Basic BGP Device Convergence", Benchmarking Working Group, Internet-Draft, draft-ietf-bmwg-bgpbas-01.txt, Feb. 2002, http://ietforg/ietf/lid-abstracts.txt.
European Search Report, dated Jan. 25, 2012, from corresponding EP Application No. 11170649.

\* cited by examiner

*Primary Examiner* — Christopher Grey
(74) *Attorney, Agent, or Firm* — Young & Thompson (57) ABSTRACT

A method for controlling advertising of routing data to neighbor routers is presented. A list of prefixes is maintained (301) and each prefix is associated (302) with an own indicator vector that contains a data item for each of the neighbor routers so that the data item indicates (304) whether the prefix concerned is to be advertised to the neighbor router concerned. For each neighbor router there is (303) a handling pointer pointing to the prefix that is relevant to the status of an advertising process related to this neighbor router, and the handling pointer is moved forward on the list of prefixes according as the prefixes are advertised to this neighbor router. As there is no need to maintain an own list of prefixes for each neighbor router separately, but only neighbor router-specific entries in the indicator vectors, savings can be achieved in the required memory space.

26 Claims, 3 Drawing Sheets

METHOD AND A DEVICE FOR CONTROLLING ADVERTISING OF ROUTING DATA

FIELD OF THE INVENTION

The invention relates to a method and to a device for controlling advertising of routing data from a router to other routers in a data transfer network. Furthermore, the invention relates to a computer program for controlling advertising of routing data from a router to other routers in a data transfer network. Furthermore, the invention relates to a router capable of advertising routing data to other routers.

BACKGROUND

A routing protocol is a protocol that specifies how routers communicate with each other for distributing information that enables them to select routes in a data transfer network. Each router has a priori knowledge only of areas of the data transfer network attached to it directly. A routing protocol advertises this information first among immediate neighbor routers, and then throughout the data transfer network. This way, routers gain knowledge of the topology of the data transfer network. For example, in a Border Gateway Protocol ("BGP"), prefixes and their related attributes received at a router from its neighbor routers are first organized to an Adjacency route information-base for Incoming information "Adj_Rib_In". This information-base is then pruned so that e.g. unnecessary duplicates are removed. The result constitutes a Local information-base "Loc_Rib". The prefixes and their related attributes contained in the Loc_Rib are advertised, according to appropriate policies, to neighbor routers in order to make the neighbor routers aware of network areas, i.e. sub-networks corresponding to the prefixes, which are accessible via the router under consideration. Traditionally, the advertising to neighbor routers is carried out so that an Adjacency route information-base for outgoing information "Adj_Rib_Out" is created for each neighbor router. Each Adj_Rib_Out is logically a list of prefixes and their related attributes which are to be advertised to the neighbor router related to that particular Adj_Rib_Out. An Adj_Rib_Out can be, for example, a linked list where each prefix is associated with a forward pointer pointing to a next prefix and a backward pointer pointing to a previous prefix on the list constituting the Adj_Rib_Out. The Adj_Rib_Out is constructed for each neighbor router so that policy appropriate for that neighbor router is applied to the prefixes and their related attributes contained in the Loc_Rib. The advertising process for each neighbor router proceeds along the Adj_Rib_Out related to that neighbor router so that those prefixes and their associate attributes that still are to be advertised are sent to the neighbor router under consideration. The problem associated with the advertisement process briefly described above is that the total memory space needed for the Adj_Rib_Out:s grows very strongly when the size of the data transfer network grows. This is due to the fact that both the number of the Adj_Rib_Out:s and the number of entries in each Adj_Rib_Out increase when the size of the data transfer network grows, and thus the memory consumption is proportional to the product of these two numbers. Thus the scalability is limited.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new method for controlling advertising of routing data from a first router to second routers, the routing data comprising prefixes related to areas of a data transfer network accessible via the first router. The method comprises:

maintaining a main list of the prefixes so that each prefix has a predecessor and/or a successor on the main list, maintaining indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item, maintaining, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and determining, concerning each second router on the basis of the indicator vector associated with the prefix corresponding to the position of the main handling pointer related to this second router, whether or not this prefix needs to be advertised to this second router.

An indicator vector related to a prefix can be for example a bit map having, for example, the following two-bit data item for each of the second routers: a first bit for indicating whether the prefix, and possibly also its attributes, is/are to be advertised to the second router concerned and a second bit for indicating whether the said prefix, and possibly also and its attributes, has/have already been advertised to the said second router. Hence, the advertising processes for all the second routers can use the same main list of prefixes. As there is no need to maintain an own list of prefixes for each of the second routers separately, but only second router-specific entries in the indicator vectors, the required memory space is substantially smaller than that in conjunction with the traditional method described in the Background-section of this document.

In conjunction with the IPv4 (Internet Protocol version 4) and the IPv6 (Internet Protocol version 6), a prefix is typically defined as an address and a length of a network mask. In the case of the VPN (Virtual Private network), a prefix may further comprise a route distinguisher ("RD"). In conjunction with the BGP (Border gateway Protocol), a prefix can be seen as a key that uniquely identifies routing information related to a device or a network area accessible via a router under consideration.

In accordance with the second aspect of the invention there is provided a new device for controlling advertising of routing data from a first router to second routers, the routing data comprising prefixes related to areas of a data transfer network accessible via the first router. The device comprises a processor arranged to:

maintain a main list of the prefixes so that each prefix has a predecessor and/or a successor on the main list, maintain indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item, maintain, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and determine, concerning each second router on the basis of the indicator vector associated with the prefix corresponding to the position of the main handling pointer related to this second router, whether or not this prefix needs to be advertised to this second router.

In accordance with the third aspect of the invention there is provided a new router that comprises:

data transfer ports for connecting to data transfer links,
a processing system for supporting a routing protocol, and
a device according to the present invention for controlling advertising of routing data from the router to other routers, the routing data being related to the routing protocol and comprising prefixes related to areas of a data transfer network accessible via the router, wherein the processing system is arranged to advertise one or more of the prefixes to one or more of the other routers as a response to situation in which the device has determined that these prefixes needs to be advertised to these other routers.

In accordance with the fourth aspect of the invention there is provided a new computer program for controlling advertising of routing data from a first router to second routers, the routing data comprising prefixes related to areas of a data transfer network accessible via the first router. The computer program comprises computer executable instructions for controlling a programmable processor to:

maintain a main list of the prefixes so that each prefix has a predecessor and/or a successor on the main list, maintain indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item, maintain, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and determine, concerning each second router on the basis of the indicator vector associated with the prefix corresponding to the position of the main handling pointer related to this second router, whether or not this prefix needs to be advertised to this second router.

In accordance with the fifth aspect of the invention there is provided a new computer program product. The computer program product comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
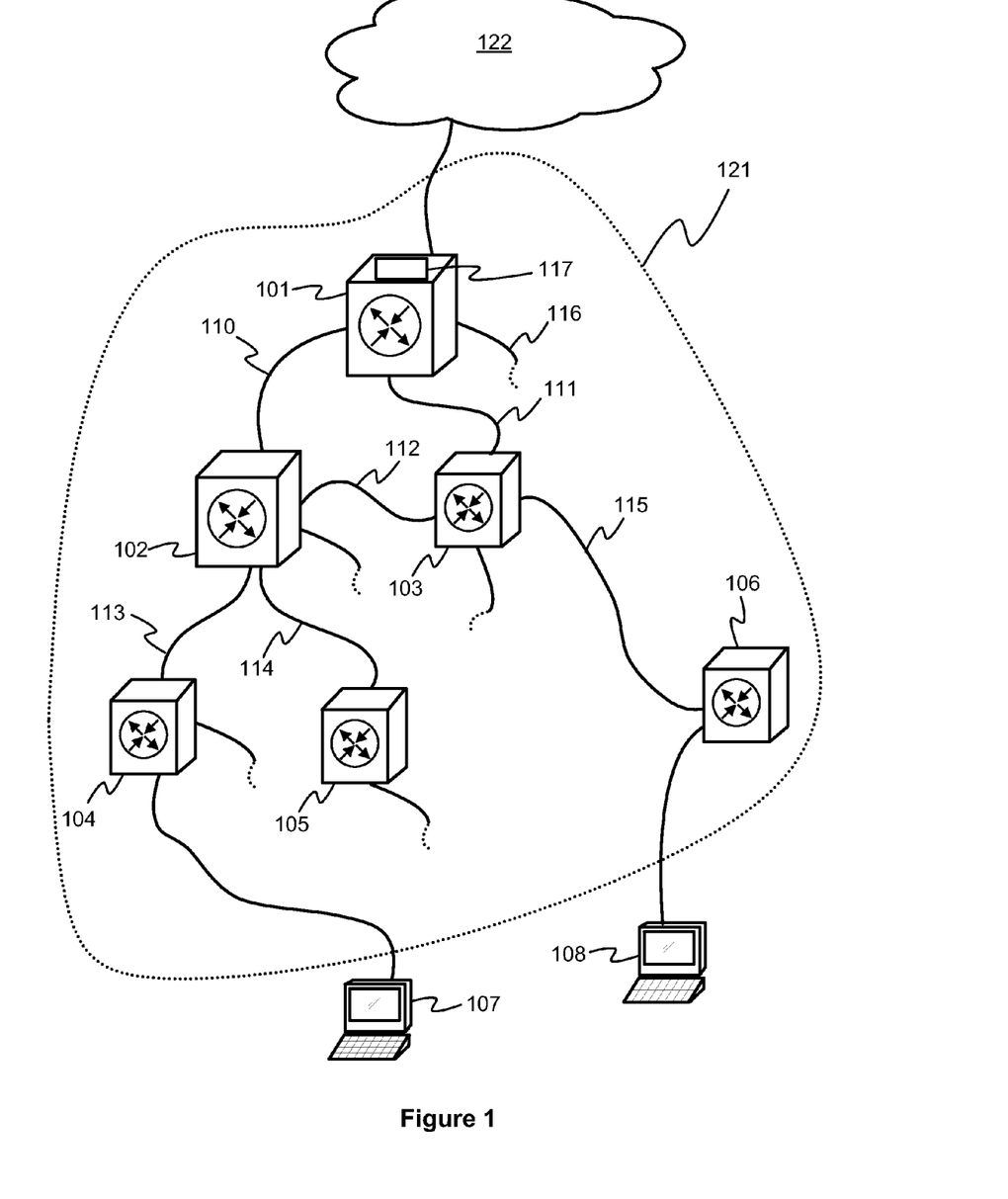
FIG. 1 shows a schematic illustration of an exemplifying data transfer network comprising a router according to an embodiment of the invention.

FIG. 1 shows a schematic illustration of an exemplifying data transfer network which comprises a router 101 according to an embodiment of the invention. The data transfer network can be, for example but not necessarily, the Internet and a part 121 can represent an autonomous system ("AS") of the Internet and a part 122 can represent the rest of the Internet. The data transfer network can as well be an isolated network that is not connected to the public Internet. The part 121 of the data transfer network comprises the router 101 and also routers 102, 103, 104, 105, and 106. These routers are interconnected with physical data transfer links 110, 111, 112, 113, 114, and 115, each of which being an electrical or optical cable or a radio link, and the routers are preferably arranged to support the Internet Protocol. Furthermore, the routers may be arranged to support, for example, the Multi Protocol Label Switching ("MPLS"). Terminal devices 107 and 108 can be connected to the data transfer network as illustrated in FIG. 1. In addition to the routers 101-106, the part 121 of the data transfer network may comprise other routers and network devices which are not shown in FIG. 1 and/or the part 121 may be connected to terminal devices which are not shown in FIG. 1. This is illustrated in FIG. 1 with data transfer links drawn to continue as a dashed-line such as a data transfer link 116.

Each of the routers 101-106 comprises data transfer ports for connecting to data transfer links and a processing system for supporting one or more routing protocols that advertise routing data first among immediate neighbor routers, and then throughout the data transfer network. The routing data comprises prefixes related to areas of the data transfer network, i.e. subnets, accessible via a router under consideration. Thus, the routers gain knowledge of the topology of the data transfer network. Without limiting the generality, we can focus on considering the router 101. The router 101 comprises a device 117 for controlling advertising of the routing data from the router 101 to its neighbor routers 102 and 103 and also to its neighbor routers in the part 122 of the data transfer network. It should be noted that in conjunction with certain a routing protocols the term "neighbor routers" is not limited to mean only "immediate neighbor routers" between which there is only one hop but there can be more hops between neighbors. Hence, in conjunction with certain routing protocols, the router 101 can advertise routing data also to routers 104-106, i.e. the router 101 can advertise routing data to the other routers 102-106. The processing system of the router 101 is arranged to advertise one or more of the prefixes to one or more of the neighbor routers as a response to situation in which the device 117 has determined that these prefixes needs to be advertised to these neighbor routers. The router 101 can be arranged to support, for example, the external Border Gateway Protocol (eBGP) for cooperating with the part 122 of the data transfer network, in which case the routing data comprises routing data of the external Border Gateway Protocol, and an internal Border Gateway Protocol (iBGP) for operating inside the part 121 of the data transfer network, in which case the routing data comprises routing data of the internal Border Gateway Protocol. In the case of the iBGP, the router 101 can advertise the routing data not only to its immediate neighbor routers 102 and 103 but also to routers 104-106 which are neighbors behind two hops.

The device 117 for controlling advertising of the routing data from the router 101 to its neighbor routers comprises a processor arranged to maintain a main list of the prefixes so that each prefix has a predecessor and/or a successor on the main list. The main list can be, for example, a linked list in which each prefix is associated with a forward pointer pointing to a successor prefix that is next on the main list and a backward pointer pointing to a predecessor prefix that is previous on the main list. The processor of the device 117 is arranged to maintain indicator vectors so that each of the prefixes is associated with one of the indicator vectors. Each indicator vector contains data items so that there is a data item for each of the neighbor routers and each data item indicates whether the prefix associated with the indicator vector under consideration is to be advertised to the neighbor router associated with the data item under consideration. The indicator vectors can be constructed on the basis of e.g. attributes related to the prefixes. The processor of the device 117 is arranged to maintain, for each of the neighbor routers, a main handling pointer pointing to a particular one of the prefixes that is relevant to a prevailing status of an advertising process related to this neighbor router. Each main handling pointer is moved forward on the main list of the prefixes according as the prefixes are being advertised to the neighbor router associated with that main handling pointer. Concerning each main handling pointer, the processor of the device 117 is arranged to determine on the basis of the indicator vector associated with the prefix corresponding to the position of that main handling pointer, whether or not this prefix needs to be advertised to the neighbor router which is related to that main handling pointer. Each data item of the indicator vector may include, for example, a first variable for indicating whether or not the prefix related to this indicator vector is a prefix to be advertised to the neighbor router related to this data item, and a second variable for indicating whether or not the prefix related to this indicator vector has already been advertised to the neighbor router related to this data item. The first variable can be a single bit and, correspondingly the second variable can as well be a single bit. The processor of the device 117 may be arranged, for example, to determine that the prefix corresponding to the position of the main handling pointer needs to be advertised to the corresponding neighbor router as a response to a situation in which the first variable indicates that this prefix is a prefix to be advertised to this neighbor router and the second variable indicates that this prefix has not yet been advertised to this neighbor router. The processor is preferably further arranged to deliver the result of this determination to the processing system which is arranged to run the routing protocols. After the delivery of the result, the second variable can be set to indicate that the prefix under consideration has already been advertised, or ordered to be advertised, to the neighbor router under consideration. The processor of the device 117 can be implemented with one or more processor units, each of which can be a programmable processor unit provided with appropriate software. Furthermore, same processer unit or units can be used for implementing both the device 117 and the processing system that is arranged to run the routing protocols.

Figure 2:
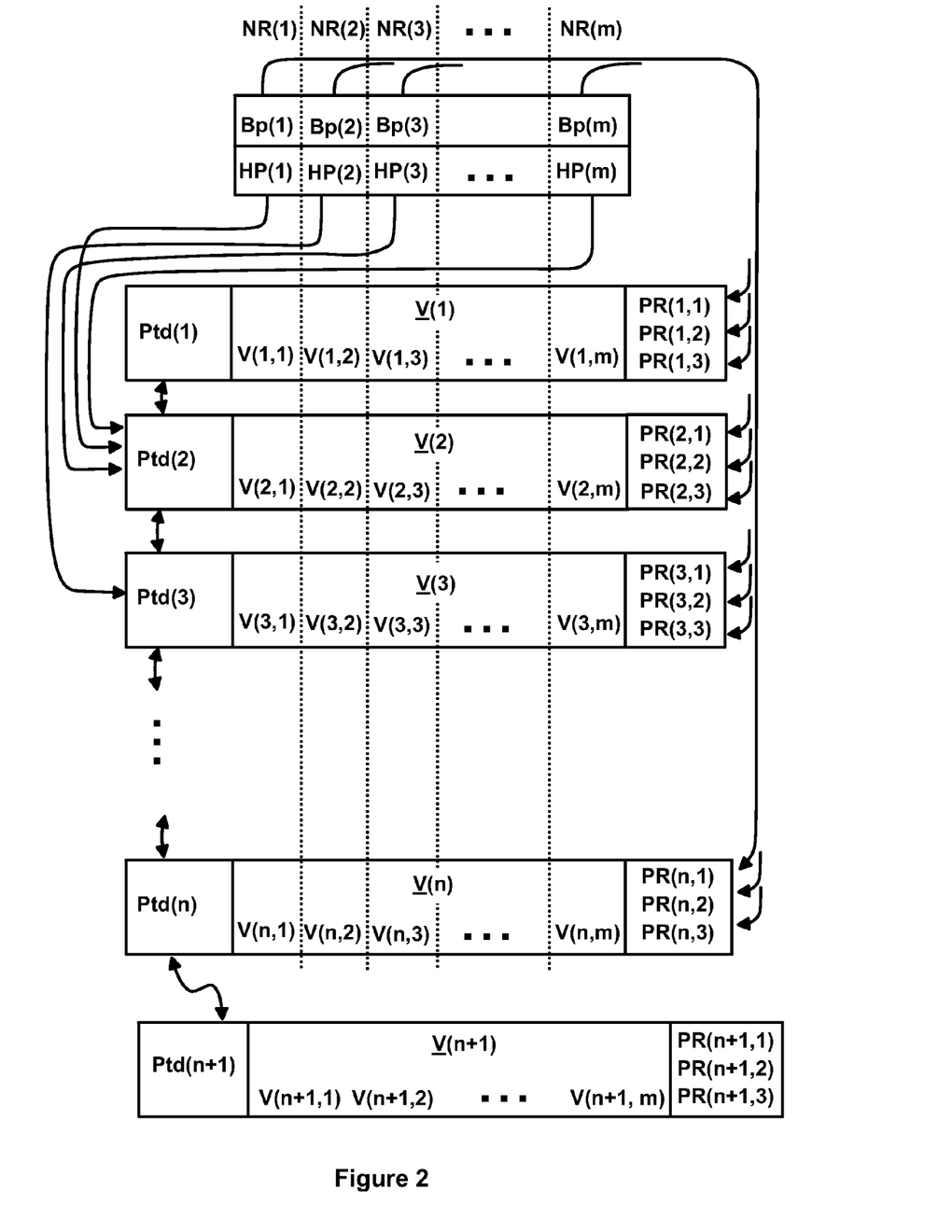
FIG. 2 shows a schematic illustration of an exemplifying data structure used in a method according to an embodiment of the invention for controlling advertising of routing data from a router to other routers in a data transfer network.

FIG. 2 shows a schematic illustration of an exemplifying data structure that can be used for controlling advertising of routing data from the router 101 to its neighbor routers in the data transfer network shown in FIG. 1. Each prefix is associated with a data field that contains a prefix-specific indicator vector V and pointer data Ptd. With the aid of the pointer data, the main list of prefixes is maintained as a linked list. In FIG. 2, V(1) is the indicator vector of prefix 1 and Ptd(1) is the pointer data of the prefix 1, V(2) and Ptd(2) are the indicator vector and the pointer data of prefix 2, . . . , and V(n) and Ptd(n) are the indicator vector and the pointer data of prefix n. Each pointer data Ptd(i), where i=1, 2, . . . , n, may contain for example the following data:

Ptd_Pr(i)=a pointer to memory areas which contain the prefix i and its attributes, Ptd_F(i)=a forward pointer to a memory area which contains the pointer data Ptd(i+1) of the next prefix on the main list, this pointer being a null pointer if prefix i is the last one on the main list, and Ptd_B(i)=a backward pointer to a memory area which contains the pointer data Ptd(i−1) of the previous prefix on the main list, this pointer being a null pointer if prefix i is the first one on the main list.

Each indicator vector V(i), where i=1, 2, . . . , n, contains a data item V(i, j) for each neighbor router NR(j), where j=1, 2, . . . , m. For example, the neighbor router NR(1) can be the router 102 and the neighbor router NR(2) can be the router 103 shown in FIG. 1, and the neighbor routers NR(3), . . . , and NR(m) can be routers of the part 122 of the data transfer network shown in FIG. 1. The data item V(i, j) may contain for example a first bit that indicates whether the prefix i is to be advertised to the neighbor router j, and a second bit that indicates whether the prefix i has already been advertised, or ordered to be advertised, to the neighbor router NR(j).

For each of the neighbor routers NR(j), where j=1, 2, . . . , m, there is a main handling pointer HP(j) pointing to a prefix that is relevant to a prevailing status of the advertising process related to the neighbor router NR(j). In the exemplifying situation shown in FIG. 2, for example the main handling pointer HP(1) of the neighbor router NR(1) points to the prefix 2 by pointing to the pointer data Ptd(2) of the prefix 2. When the advertising process related to the neighbor router NR(1) proceeds, the main handling pointer HP(1) is shifted to point to the pointer data Ptd(3) of the prefix 3. Thus, the main handling pointer HP(1) is moved forward on the main list of the prefixes, i.e. downwards in FIG. 2, according as the prefixes are being advertised to the neighbor router NR(1). The main handling pointer HP(j), where j=1, 2, . . . , m, may be arranged to point, for example, to a prefix that has been last advertised to appropriate neighbor routers or, for another example, it may be arranged to point to a prefix that is currently under determination concerning neighbor routers to which, if any, the prefix needs to be advertised. Concerning for example the main handling pointer HP(1), it is possible that the prefix 2 is the prefix which has last been advertised to appropriate neighbor routers, if any, and the prefix 3 is currently under determination concerning the neighbor routers to which, if any, the prefix 3 should be advertised. As well it is possible that the prefix 2 is currently under determination concerning the neighbor routers to which, if any, the prefix 2 should be advertised. In principle, any pre-determined offset is possible between the main handling pointer and the prefix under the above-mentioned determination. Without limiting the generality, we can focus on the case in which the main handling pointer points to a prefix that is at each time under the above-mentioned determination. For example, in the situation shown in FIG. 2, it is under determination on the basis of the data item V(3, 2) whether or not the prefix 3 needs to be advertised to the neighbor router NR(2).

In a device according to an embodiment of the invention for controlling advertising of routing data, a processor of the device is arranged to maintain one or more similarity lists so that each similarity list contains prefixes whose attributes are similar in light of a predetermined criterion. The attributes can indicate, for example but not necessarily, AS-path of the route (Autonomous System), a nexthop, an origin, a route target, an extended community identifying a VPN-membership (Virtual Private Network), and/or other issues related to a subnet represented by the prefix under consideration or to a route to this subnet via the router under consideration. The prefixes can be classified into the similarity lists by comparing the corresponding attributes of the prefixes with each other or by using a suitable hash-function for the classification. The processor of the device is arranged to determine, as a response to a situation in which a prefix corresponding to the position of a main handling pointer needs to be advertised to a corresponding neighbor router, and on the basis of the indicator vectors, whether or not one or more of other prefixes on the similarity list that contains the prefix corresponding to the position of the main handling pointer need to be advertised to the corresponding neighbor router.

Referring to FIG. 2, the above-described similarity lists and the operations related thereto can be implemented for example as described below.

Each pointer data Ptd(i), where i=1, 2, . . . , n, may further contain for example the following data:

Ptd_S(i)=a similarity pointer to a memory area which contains the pointer data Ptd(k) of the prefix k that has similar attributes as the prefix i and is closest on the main list after the prefix i, i.e. k=min{I, I>i and prefix I that has similar attributes as prefix i}, this pointer being a null pointer if the prefix I is the last one on the similarity list.

Therefore, each similarity list is a linked list so that each prefix on that similarity list is associated with a pointer to a next prefix on that similarity list. For the sake of illustration we consider the neighbor router NR(3). The main handling pointer HP(3) points to the pointer data Ptd(2) of the prefix 2. The data item V(2, 3) indicated whether or not the prefix 2, and possibly its attributes, needs to be advertised to the neighbor router NR(3). If there is the need to advertise the prefix 2 to the neighbor router NR(3), we check whether the similarity pointer Ptd_S(2) points to the pointer data of any other prefix or whether Ptd_S(2) is a null pointer. Now we assume that Ptd_S(2) points to the pointer data of the prefix k1, i.e. the prefix k1 belongs to the same similarity list as the prefix 2. We check from the data item V(k1, 3) whether the prefix k1 needs to be advertised to the neighbor router NR(3). Thereafter, we check from the pointer data Ptd(k1) of the prefix k1 whether Ptd_S(k1) points to the pointer data of any other prefix or whether Ptd_S(k1) is a null pointer. Now we assume that Ptd_S(k1) points to the pointer data of the prefix k2, i.e. the prefix k2 belongs to the same similarity list as the prefix 2 and the prefix k1. We check from the data item V(k2, 3) whether the prefix k2 needs to be advertised to the neighbor router NR(3). Thereafter, we check from the pointer data Ptd(k2) of the prefix k2 whether Ptd_S(k2) points to the pointer data of any other prefix or whether Ptd_S(k2) is a null pointer. This is continued until arrival at pointer data having a null pointer as the similarity pointer or until a predetermined number of prefixes which needs to be advertised to the neighbor router NR(3) has been found. The prefixes which need to be advertised to the neighbor router NR(3) are advantageously collected to a single advertising message, e.g. a IP-packet, that is transmitted to the neighbor router NR(3). For each prefix which is advertised to the neighbor router NR(3), the data item V(prefix number, 3) is set to indicate that this prefix has already been advertised to the neighbor router NR(3). Thereafter the main handling pointer HP(3) is updated to point to the pointer data Ptd(3) of the prefix 3. The above-mentioned data items are set to indicate that the above-mentioned prefixes have already been advertised to the neighbor router NR(3) in order to avoid unnecessary duplicate advertising for example when the main handling pointer HP(3) at some stage of the advertising process reaches Ptd(k1). Preferably, the advertising message contains only once the attributes that are same for the prefixes contained in the advertising message in order to avoid unnecessary duplicate data in the advertising message.

When the similarity lists are implemented in the above-described manner with aid of the similarity pointers Ptd_S, the prefixes of each similarity list are in a mutual order corresponding to the mutual order of the prefixes on the main list, and the prefixes of the similarity list that contains the prefix corresponding to the position of the main handling pointer are checked in this mutual order.

In a device according to an embodiment of the invention for controlling advertising of routing data, a processor of the device is arranged to run, as a response to a situation in which a prefix has been deemed to be a prefix that needs to be advertised to a neighbor router, a policy function specific to this neighbor router so that this prefix and its attributes are input quantities of the policy function. The processor is further arranged to allow or disallow the advertising of this prefix to this neighbor router on the basis of a policy result obtained with the policy function. A policy function may determine, for example, that prefixes which are related to certain areas of the data transfer network must not be advertised to a neighbor router which is related to the policy function in question. Because of the policy function, all prefixes appearing on a same similarity list are not necessarily treated in a same way. When a similarity list is went through and the policy function indicates that a prefix under consideration is not to be handled in the same way as the prefixes found earlier from the similarity list, this prefix can be bypassed and the process can continue on the next prefix on the similarity list or the process on this similarity list can be stopped, i.e. no more prefixes are checked from this similarity list. It is even possible that the policy function changes the attributes of a prefix.

In a device according to an embodiment of the invention for controlling advertising of routing data, a processor of the device is arranged to maintain policy groups so that each policy group contains such neighbor routers which are related to a same policy function. The device is arranged to store, concerning each prefix and each policy group, a policy result that corresponds to this prefix, its attributes, and the policy function related to this policy group. The processor is arranged to use the stored policy result instead of running the policy function as a response to a situation in which this prefix needs to be advertised to any neighbor router belonging to this policy group. The above-mentioned storing and reuse of the policy result can be accomplished for all policy groups or only for such policy groups in which the number of neighbor routers exceeds a predetermined limit.

Referring to FIG. 2, the above-described policy groups and the operations related thereto can be implemented for example as described below.

Each prefix-specific data field contains prefix-specific policy results PR in addition to the prefix-specific indicator vector V and the prefix-specific pointer data Ptd. In the exemplifying case shown in FIG. 2, it is assumed that there are three different policy functions. A first policy function is related to a first subgroup of the neighbor routers, a second policy function is related to a second subgroup of the neighbor routers, and a third policy function is related to a third subgroup of the neighbor routers. For example, a data element PR(2,1) shown in FIG. 2 can represent the policy result corresponding to the prefix 2, its attributes, and the first policy function, and correspondingly for example a data element PR(n,3) can represent the policy result corresponding to the prefix n, its attributes, and the third policy function. For each neighbor router NR(1), ..., NR(m) there can be a base pointer with the aid of which a pointer P to a relevant policy result can be constructed for each prefix and each neighbor router. In FIG. 2, data elements Bp can represent the base pointers. The pointer P(i, j) for the prefix i and the neighbor router j, where i=1, 2, ..., n and j=1, 2, ..., m, can be constructed in principle as P(i, j)=Bp(j)+starting address of Ptd(i)+a predetermined offset. It is also possible that each prefix-specific data field contains pointers to policy results of all or only biggest policy groups for the prefix under consideration and its attributes. Each neighbor router is associated with data that indicates which one of the said pointers is related to that neighbor router. In this case, the data elements PR(i, k) shown in FIG. 2, where i=1, ..., n and k=1, 2 or 3, can be the pointers to the policy results of the three biggest policy groups for each prefix 1, ..., n and their attributes, and the data elements Bp(j) shown in FIG. 2, where j=1, ..., m, can be the data indicating which one of the pointers PR(i, 1), PR(i, 2) and PR(i, 3) is related to the neighbor router j.

In a device according to an embodiment of the invention for controlling advertising of routing data, a processor of the device is arranged to associate the neighbor routers, whose main handling pointers are pointing to a same prefix on the main list of the prefixes, with each other to form a linked list and to use a single pointer to represent the main handling pointers of all the neighbor routers on the linked list. In the exemplifying situation shown in FIG. 2, the main handling pointers HP(1), HP(3), and HP(m) of the neighbor routers NR(1), NR(3), and NR(m), respectively, point to the prefix 2 via pointing to the pointer data Ptd(2). Thus, these neighbor routers can be handled with a common main handling pointer and these neighbor routers can be associated with the common main handling pointer by organizing them into a linked list related to the common main handling pointer. These linked lists of neighbor routers are preferably dynamic since advertising processes related to different neighbor routers may progress at different speeds along the main list of the prefixes.

In a device according to an embodiment of the invention for controlling advertising of routing data, a processor of the device is arranged to associate the neighbor routers, whose main handling pointers are pointing to a same prefix on the main list of the prefixes, with each other to form a linked list and to associate the prefix with a list-pointer pointing to the linked list. In the exemplifying situation shown in FIG. 2, the main handling pointers HP(1), HP(3), and HP(m) of the neighbor routers NR(1), NR(3), and NR(m), respectively, point to the prefix 2 via pointing to the pointer data Ptd(2). Thus, these neighbor routers are organized into a linked list and the prefix 2 is associated with a list-pointer pointing to this linked list. Only one common main handling pointer needs to be used for controlling the advertising processes related to NR(1), NR(3), and NR(m) since the neighbor routers related to the common main handling pointer are given in the linked list. Thus, the neighbor routers NR(1), NR(3), and NR(m) are handled as a group in the advertising procedure.

In a device according to an embodiment of the invention for controlling advertising of routing data, a processor of the device is arranged to insert a new prefix to the end of the main list of the prefixes and to form a new indicator vector for the new prefix on the basis of attributes of the new prefix as a response to a situation in which the new prefix and its attributes has been received from one of the neighbor routers and the new prefix differs from any of the existing prefixes on the main list of the prefixes. In the exemplifying situation shown in FIG. 2, pointer data Ptd(n+1) contains a pointer Ptd_Pr(n+1) to memory areas which contain the new prefix n+1 and its attributes. The forward pointer Ptd_F(n) of the pointer data Ptd(n) is a null pointer because the prefix n was the last one on the main list. The new prefix n+1 is added to the data structure by setting the forward pointer Ptd_F(n) to point to a memory area which contains the pointer data Ptd(n+1) of the new prefix, by setting the backward pointer of the pointer data Ptd(n+1) to point to a memory area which contains the pointer data Ptd(n) of the prefix n, and by constructing the indicator vector V(n+1) and possibly also the policy results PR(n+1, 1), ..., PR(n+1, 3) for the new prefix n+1. The forward pointer Ptd_F(n) of the pointer data Ptd(n) is set to be a null pointer.

In a device according to an embodiment of the invention for controlling advertising of routing data, a processor of the device is arranged to remove a prefix from the main list of the prefixes and to insert the prefix to the end of the main list of the prefixes and to form a new indicator vector for the prefix on the basis of attributes of the prefix as a response to a situation in which one or more of the attributes of the prefix have been changed. Concerning the exemplifying situation shown in FIG. 2, we assume for the sake of illustration that attributes of the prefix 2 have been changed and therefore the prefix 2 and its attributes have to be re-advertised to appropriate neighbor routers. Therefore, the data field that contains the pointer data Ptd(2), the indicator vector V(2) and the policy results PR(2, 1), ..., PR(2, 3) is removed from its current position of the main list, the indicator vector V(2) and the policy results corresponding to PR(2, 1), ..., PR(2, 3) are updated, and the updated data field is added to the end of the main list. The said removing and adding operations comprise the following actions: setting the forward pointer Ptd_F(1) to point to the Ptd(3), setting the backward pointer Ptd_B(3) to point to the Ptd(1), setting the backward pointer Ptd_B(2) to point to the Ptd(n), setting the forward pointer Ptd_F(n) to point to the Ptd(2), and setting the forward pointer Ptd_F(2) to be a null pointer. The main handling pointers HP(1), HP(3), and HP(m) or a common pointer representing all of them are/is updated to point to Ptd(3). Instead of updating the policy results during the above-described prefix updating, it is also possible to set the policy result to a non-existing status and to construct and store the updated policy results during the advertising process. Each prefix-specific data field comprises preferably a list-pointer pointing to a list of those neighbor routers whose main handling pointers point to the prefix in question. The above-mentioned list of neighbor routers is preferably a linked list. The pointer data Ptd(2) may contain a list-pointer to a list that indicates that the neighbor routers, whose main handling pointers point to Ptd(2), are NR(1), NR(3), and NR(m). Thus, it is straightforward to find out the main handling pointers that have to be updated to point to Ptd(3), and there is no need to check all the main handling pointers to find those which have the be updated to point to Ptd(3).

It should be noted that the data structure shown in FIG. 2 is not the only possible alternative. For example, if no similarity lists are used, the data structure can be simplified so that each data item V(i,j), where i=1, 2, ..., n and j=1, 2, ..., m, is only one bit because in this case the position of the main handling pointer is able to express whether a certain prefix and possibly also its attributes which is/are to be advertised has/have already been advertised.

In a device according to an embodiment of the invention for controlling advertising of routing data, a processor of the device is arranged to maintain VPN-specific (Virtual Private Network) main lists of prefixes and to run advertising processes of different VPNs in parallel with respect to each other and according to the principles described above. In this case, each prefix can comprise an address, a length of a network mask, and a route distinguisher ("RD"). Data structures according to FIG. 2 can be maintained separately for different VPNs.

In a device according to an embodiment of the invention for controlling advertising of routing data, a processor of the device is arranged to maintain group-specific main lists of prefixes for pre-defined groups of neighbor routers and to run advertising processes of different groups in parallel with respect to each other and according to the principles described above. Data structures according to FIG. 2 can be maintained separately for different groups of neighbor routers. By grouping the neighbor routers and handling the groups in parallel it is possible to make the advertising scalable for multiprocessor environments.

In a device according to an embodiment of the invention for controlling advertising of routing data, a processor of the device is arranged to maintain address family-specific main lists of prefixes for neighbor routers of each locally configured VRF-instance (Virtual Routing and Forwarding) and to run advertising processes of different address-families in each VRF-instance in parallel with respect to each other and according to the principles described above. Data structures according to FIG. 2 can be maintained separately for different address-families in different VRF-instances. By handling the address-families of each VRF-instance in parallel it is possible to make the advertising scalable for multiprocessor environments. Address family may contain e.g. IPv4 unicast routes, IPv4 VPN routes, IPv6 unicast routes, or PWE3 auto-discovery routes (Pseudo-Wire Emulation Edge-to-Edge).

Figure 3:
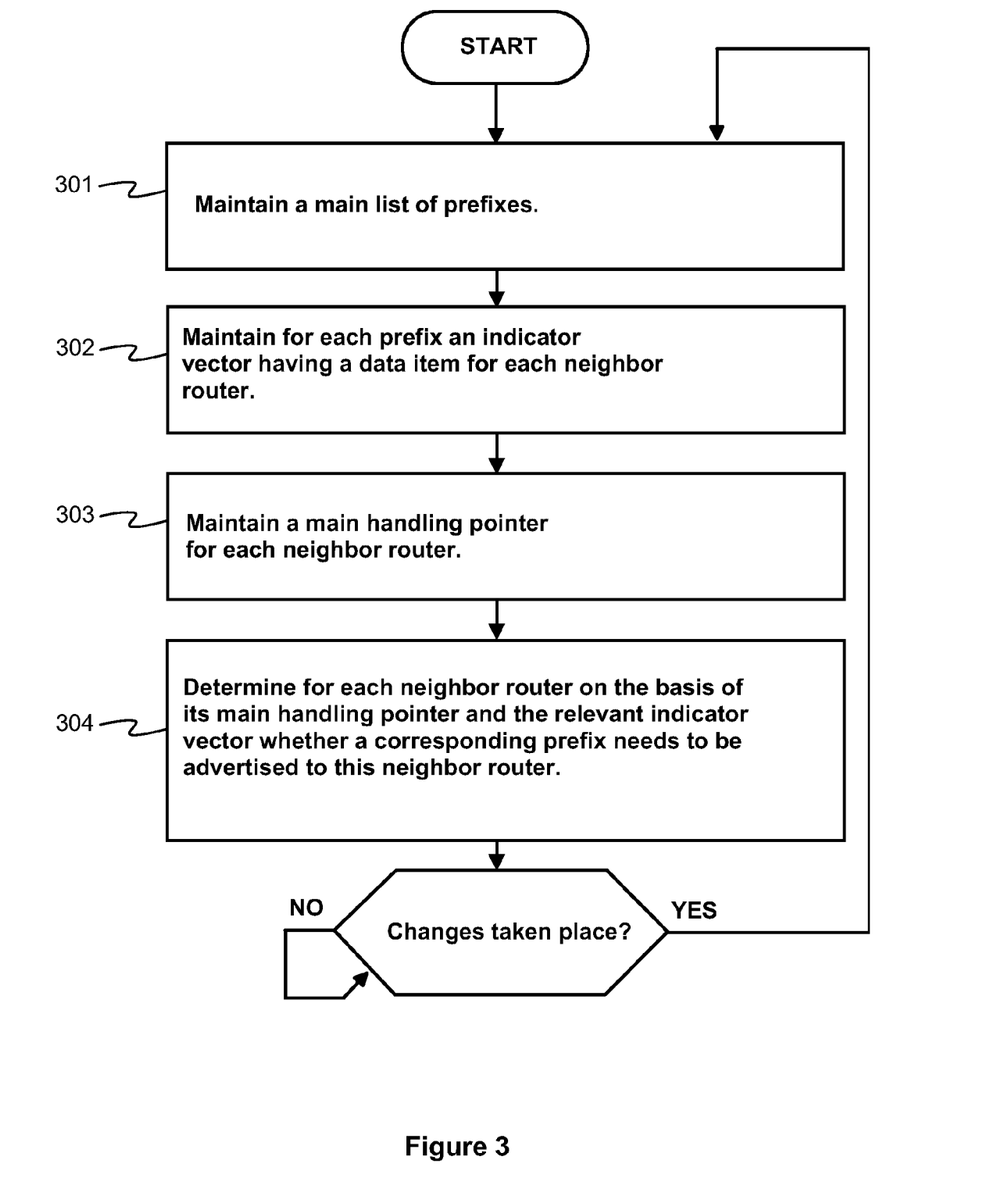
FIG. 3 shows a flow chart of a method according to an embodiment of the invention for controlling advertising of routing data from a router to other routers in a data transfer network.

FIG. 3 shows a flow chart of a method according to an embodiment of the invention for controlling advertising of routing data from a first router to its neighbor routers in a data transfer network, where the routing data comprises prefixes related to areas of the data transfer network accessible via the first router. The method comprises:
- in a phase 301 maintaining a main list of the prefixes so that each prefix has a predecessor and/or a successor on the main list,
- in a phase 302 maintaining indicator vectors so that each prefix is associated with one of the indicator vectors, each indicator vector containing a data item for each of the neighbor routers and each data item of this indicator vector indicating whether the prefix associated to this indicator vector is to be advertised to the neighbor router associated with this data item,
- in a phase 303 maintaining, for each of the neighbor routers, a main handling pointer pointing to a particular one of the prefixes that is relevant to a prevailing status of an advertising process related to this neighbor router, said main handling pointer being moved forward on the main list of the prefixes when the prefixes are being advertised to the neighbor router associated with the main handling pointer, and
- in a phase 304 determining, concerning each neighbor router on the basis of the indicator vector associated with the prefix corresponding to the position of the main handling pointer related to this neighbor router, whether or not this prefix needs to be advertised to this neighbor router.

In a method according to an embodiment of the invention, each data item of each indicator vector comprises:
- a first variable for indicating whether or not the prefix related to this indicator vector is a prefix to be advertised to the neighbor router related to this data item, and
- a second variable for indicating whether or not the prefix related to this indicator vector has already been advertised to the neighbor router related to this data item, wherein the prefix corresponding to the position of the main handling pointer is deemed to be a prefix that needs to be advertised to the corresponding neighbor router if the first variable indicates that this prefix is a prefix to be advertised to this neighbor router and the second variable indicates that this prefix has not yet been advertised to this neighbor router, and the method comprises setting the second variable to indicate that this prefix has already been advertised to this neighbor router as a response to the advertising of this prefix to this neighbor router.

In a method according to an embodiment of the invention, one or more similarity lists are maintained so that each similarity list contains such prefixes whose attributes are similar in light of a predetermined criterion and, as a response to a situation in which the prefix corresponding to the position of the main handling pointer needs to be advertised to the corresponding neighbor router, it is determined on the basis of the indicator vectors whether or not one or more other prefixes on the similarity list that contains the prefix corresponding to the position of the main handling pointer need to be advertised to the corresponding neighbor router.

A method according to an embodiment of the invention further comprises:
- keeping the prefixes on each similarity list in a mutual order corresponding to the mutual order of the prefixes on the main list, and
- selecting the one or more of the other prefixes to be the prefixes which are on the similarity list after, in the mutual order of the prefixes, the prefix corresponding to the position of the main handling pointer.

A method according to an embodiment of the invention comprises running, as a response to a situation in which one of the prefixes has been deemed to be a prefix that needs to be advertised to one of the neighbor routers, a policy function specific to this neighbor router so that this prefix and its attributes are input quantities of the policy function, and allowing or disallowing the advertising of this prefix to this neighbor router on the basis of a policy result obtained with the policy function.

A method according to an embodiment of the invention comprises:

maintaining policy groups so that each policy group contains such neighbor routers which are related to a same policy function, storing, for each prefix and each policy group, a policy result that corresponds to this prefix, its attributes, and the policy function related to this policy group, and using the stored policy result instead of running the policy function as a response to a situation in which this prefix needs to be advertised to any neighbor router belonging to this policy group.

The above-mentioned storing and reuse of the policy result can be accomplished for all policy groups or only for such policy groups in which the number of neighbor routers exceeds a predetermined limit.

A method according to an embodiment of the invention comprises associating the neighbor routers, whose main handling pointers are pointing to a same prefix on the main list of the prefixes, with each other to form a linked list and using a single pointer to represent the main handling pointers of all the neighbor routers on the linked list.

A method according to an embodiment of the invention comprises inserting a new prefix to the end of the main list of the prefixes and to form a new indicator vector for the new prefix on the basis of attributes of the new prefix as a response to a situation in which the new prefix and its attributes has been received from one of the neighbor routers and the new prefix differs from any of the existing prefixes on the main list of the prefixes.

A method according to an embodiment of the invention comprises removing a prefix from the main list of the prefixes and inserting the prefix to the end of the main list of the prefixes and to form a new indicator vector for the prefix on the basis of attributes of the prefix as a response to a situation in which one or more of the attributes of the prefix have been changed.

In a method according to an embodiment of the invention, the main list of the prefixes is a linked list.

A computer program according to an embodiment of the invention comprises software modules for controlling advertising of routing data from a first router to its neighbor routers, wherein the routing data comprises prefixes related to areas of a data transfer network accessible via the first router. The software modules comprise computer executable instructions for controlling a programmable processor to:

maintain a main list of the prefixes so that each prefix has a predecessor and/or a successor on the main list, maintain indicator vectors so that each of the prefixes is associated with one of the indicator vectors, each indicator vector containing a data item for each of the neighbor routers and each data item of this indicator vector indicating whether the prefix associated to this indicator vector is to be advertised to the neighbor router associated with this data item, maintain, for each of the neighbor routers, a main handling pointer pointing to a particular one of the prefixes that is relevant to a prevailing status of an advertising process related to this neighbor router, said main handling pointer being moved forward on the main list of the prefixes when the prefixes are being advertised to the neighbor router associated with the main handling pointer, and determine, concerning each neighbor router on the basis of the indicator vector associated with the prefix corresponding to the position of the main handling pointer related to this neighbor router, whether or not this prefix needs to be advertised to this neighbor router.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting. Therefore, the invention is not limited merely to the embodiments described above, many variants being possible.

What is claimed is:

1. A device for controlling advertising of routing data from a first router to second routers, the routing data comprising prefixes related to areas of a data transfer network accessible via the first router, and the device comprising a processor arranged to:

maintain a main list of the prefixes so that each prefix has a predecessor and/or a successor on the main list, maintain indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item, maintain, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and determine, concerning each second router on the basis of the indicator vector associated with the prefix corresponding to a position of the main handling pointer related to this second router, whether or not this prefix needs to be advertised to this second router.

2. A device according to claim 1, wherein each data item of each indicator vector comprises:

a first variable for indicating whether or not the prefix related to this indicator vector is a prefix to be advertised to the second router related to this data item, and a second variable for indicating whether or not the prefix related to this indicator vector has already been advertised to the second router related to this data item, wherein the processor is arranged to determine that the prefix corresponding to the position of the main handling pointer needs to be advertised to the corresponding second router as a response to a situation in which the first variable indicates that this prefix is a prefix to be advertised to this second router and the second variable indicates that this prefix has not yet been advertised to this second router, and the processor is arranged to set the second variable to indicate that this prefix has already been advertised to this second router as a response to the advertising of this prefix to this second router.

3. A device according to claim 1, wherein the processor is arranged to maintain one or more similarity lists so that each similarity list contains such prefixes whose attributes are similar in light of a predetermined criterion and, as a response to a situation in which the prefix corresponding to the position of the main handling pointer needs to be advertised to the corresponding second router, to determine on the basis of the indicator vectors whether or not one or more of other prefixes on the similarity list that contains the prefix corresponding to the position of the main handling pointer need to be advertised to the corresponding second router.

4. A device according to claim 3, wherein the processor is arranged to:
keep the prefixes on each similarity list in a mutual order corresponding to the mutual order of the prefixes on the main list, and
select the one or more of the other prefixes to be the prefixes which are on the similarity list after, in the mutual order of the prefixes, the prefix corresponding to the position of the main handling pointer.

5. A device according to claim 1, wherein the processor is arranged to run, as a response to a situation in which one of the prefixes has been deemed to be a prefix that needs to be advertised to one of the second routers, a policy function specific to this second router so that this prefix and its attributes are input quantities of the policy function, and to allow or disallow the advertising of this prefix to this second router on the basis of a policy result of the policy function.

6. A device according to claim 5, wherein the processor is arranged to maintain policy groups so that each policy group contains such second routers which are related to a same policy function, the device is arranged to store, concerning each prefix and at least one of the policy groups, a policy result that corresponds to this prefix, its attributes, and the policy function related to this policy group, and the processor is arranged to use the stored policy result instead of running the policy function as a response to a situation in which this prefix needs to be advertised to any second router belonging to this policy group.

7. A device according to claim 1, wherein the processor is arranged to associate the second routers, whose main handling pointers are pointing to a same prefix on the main list of the prefixes, with each other to form a linked list and to use a single pointer to represent the main handling pointers of all the second routers on the linked list.

8. A device according to claim 1, wherein the processor is arranged to insert a new prefix to the end of the main list of the prefixes and to form a new indicator vector for the new prefix on the basis of attributes of the new prefix as a response to a situation in which the new prefix and its attributes has been received from one of the second routers and the new prefix differs from any of the existing prefixes on the main list of the prefixes.

9. A device according to claim 1, wherein the processor is arranged to remove a prefix from the main list of the prefixes and to insert the prefix to the end of the main list of the prefixes and to form a new indicator vector for the prefix on the basis of attributes of the prefix as a response to a situation in which one or more of the attributes of the prefix have been changed.

10. A device according to claim 1, wherein the processor is arranged to maintain the main list of the prefixes in a form of a linked list.

11. A router comprising:
data transfer ports for connecting to data transfer links,
a processing system for supporting a routing protocol, and
a device for controlling advertising of routing data from the router to other routers, the routing data being related to the routing protocol and comprising prefixes related to areas of a data transfer network accessible via the router, the device being configured to:
maintain a main list of the prefixes so that each prefix has a predecessor and/or a successor on the main list,
maintain indicator vectors so that each of the prefixes is associated with one of the indicator vectors, each indicator vector containing a data item for each of the other routers and each data item of this indicator vector indicating whether the prefix associated to this indicator vector is to be advertised to the other router associated with this data item,
maintain, for each of the other routers, a main handling pointer pointing to a particular one of the prefixes that is relevant to a prevailing status of an advertising process related to this other router, said main handling pointer being moved forward on the main list of the prefixes when the prefixes are being advertised to the other router associated with the main handling pointer, and
determine, concerning each other router on the basis of the indicator vector associated with the prefix corresponding to a position of the main handling pointer related to this other router, whether or not this prefix needs to be advertised to this other router,
wherein the processing system is arranged to advertise one or more of the prefixes to one or more of the other routers as a response to situation in which the device has determined that these prefixes needs to be advertised to these other routers.

12. A router according to claim 11, wherein the processing system is arranged to support the external Border Gateway Protocol (eBGP) and the routing data comprises routing data of the external Border Gateway Protocol.

13. A router according to claim 11, wherein the processing system is arranged to support an internal Border Gateway Protocol (iBGP) and the routing data comprises routing data of the internal Border Gateway Protocol.

14. A router according to claim 11, wherein the processing system comprises one or more processor units and the device is implemented with one or more of the processor units.

15. A router according to claim 11, wherein the processing system is arranged to support the Multi Protocol Label Switching (MPLS).

16. A method for controlling advertising of routing data from a first router to second routers, the routing data comprising prefixes related to areas of a data transfer network accessible via the first router, and the method comprising:
maintaining a main list of the prefixes so that each prefix has a predecessor and/or a successor on the main list,
maintaining indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item,
maintaining, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and
determining, concerning each second router on the basis of the indicator vector associated with the prefix corresponding to a position of the main handling pointer related to this second router, whether or not this prefix needs to be advertised to this second router.

17. A method according to claim 16, wherein each data item of each indicator vector comprises:
a first variable for indicating whether or not the prefix related to this indicator vector is a prefix to be advertised to the second router related to this data item, and
a second variable for indicating whether or not the prefix related to this indicator vector has already been advertised to the second router related to this data item, wherein the prefix corresponding to the position of the main handling pointer is deemed to be a prefix that needs to be advertised to the corresponding second router if the first variable indicates that this prefix is a prefix to be advertised to this second router and the second variable indicates that this prefix has not yet been advertised to this second router, and the method comprises setting the second variable to indicate that this prefix has already been advertised to this second router as a response to the advertising of this prefix to this second router.

18. A method according to claim 16, wherein one or more similarity lists are maintained so that each similarity list contains such prefixes whose attributes are similar in light of a predetermined criterion and, as a response to a situation in which the prefix corresponding to the position of the main handling pointer needs to be advertised to the corresponding second router, it is determined on the basis of the indicator vectors whether or not one or more of other prefixes on the similarity list that contains the prefix corresponding to the position of the main handling pointer need to be advertised to the corresponding second router.

19. A method according to claim 18, wherein the method comprises:
  keeping the prefixes on each similarity list in a mutual order corresponding to the mutual order of the prefixes on the main list, and
  selecting the one or more of the other prefixes to be the prefixes which are on the similarity list after, in the mutual order of the prefixes, the prefix corresponding to the position of the main handling pointer.

20. A method according to claim 16, wherein the method comprises running, as a response to a situation in which one of the prefixes has been deemed to be a prefix that needs to be advertised to one of the second routers, a policy function specific to this second router so that this prefix and its attributes are input quantities of the policy function, and allowing or disallowing the advertising of this prefix to this second router on the basis of a policy result obtained with the policy function.

21. A method according to claim 20, wherein the method comprises:
  maintaining policy groups so that each policy group contains such second routers which are related to a same policy function,
  storing, for each prefix and for at least one of the policy groups, a policy result that corresponds to this prefix, its attributes, and the policy function related to this policy group, and
  using the stored policy result instead of running the policy function as a response to a situation in which this prefix needs to be advertised to any second router belonging to this policy group.

22. A method according to claim 16, wherein the method comprises associating the second routers, whose main handling pointers are pointing to a same prefix on the main list of the prefixes, with each other to form a linked list and using a single pointer to represent the main handling pointers of all the second routers on the linked list.

23. A method according to claim 16, wherein the method comprises inserting a new prefix to the end of the main list of the prefixes and to form a new indicator vector for the new prefix on the basis of attributes of the new prefix as a response to a situation in which the new prefix and its attributes has been received from one of the second routers and the new prefix differs from any of the existing prefixes on the main list of the prefixes.

24. A method according to claim 16, wherein the method comprises removing a prefix from the main list of the prefixes and inserting the prefix to the end of the main list of the prefixes and to form a new indicator vector for the prefix on the basis of attributes of the prefix as a response to a situation in which one or more of the attributes of the prefix have been changed.

25. A method according to claim 16, wherein the main list of the prefixes is a linked list.

26. A non-transitory computer readable medium encoded with a computer program for controlling advertising of routing data from a first router to second routers, the routing data comprising prefixes related to areas of a data transfer network accessible via the first router, and the computer program comprising computer executable instructions for controlling a programmable processor to maintain a main list of the prefixes so that each prefix has a predecessor and/or a successor on the main list, characterized in that the computer program comprises computer executable instructions for controlling the programmable processor to:
  maintain indicator vectors so that each of the prefixes is associated with one of the indicator vectors, each indicator vector containing a data item for each of the second routers and each data item of this indicator vector indicating whether the prefix associated to this indicator vector is to be advertised to the second router associated with this data item,
  maintain, for each of the second routers, a main handling pointer pointing to a particular one of the prefixes that is relevant to a prevailing status of an advertising process related to this second router, said main handling pointer being moved forward on the main list of the prefixes when the prefixes are being advertised to the second router associated with the main handling pointer, and
  determine, concerning each second router on the basis of the indicator vector associated with the prefix corresponding to a position of the main handling pointer related to this second router, whether or not this prefix needs to be advertised to this second router.

* * * * *